United States Patent Office 3,445,267
Patented May 20, 1969

3,445,267
TREATMENT OF GLASS WITH SILSESQUIOXANES TO IMPROVE DURABILITY OF SUBSEQUENT SILICONE TREATMENTS TO WASHING
Douglas K. Layne, Midland, Mich., assignor to Dow Corning Corporation, Midland, Mich., a corporation of Michigan
No Drawing. Filed Jan. 12, 1966, Ser. No. 520,079
Int. Cl. C03c 17/30
U.S. Cl. 117—72                10 Claims

ABSTRACT OF THE DISCLOSURE

A process is disclosed for the treatment of glass with a silsesquioxane whereby the durability of subsequently applied silicone treatments to washing is improved.

---

This invention relates to a process for treating glass. This invention also relates to a treated glass. This invention further relates to articles which are made from glass which has been treated in accordance with this invention.

More specifically, this invention relates to a process for treating glass which comprises first applying thereto a silsesquioxane having the general formula $RSiO_{3/2}$ wherein R is selected from the group consisting of the methyl, ethyl, vinyl, phenyl and 3,3,3-trifluoropropyl radicals, said silsesquioxane having a particle size in the range of 10 to 1,000 A., subsequently applying thereto a composition comprising (1) from 0.1 to 5% by weight of a methylhydrogensiloxane, (2) from 95 to 99.9% by weight of an essentially polydimethylsiloxane having a viscosity of at least 100 cps. at 25° C., and (3) a curing catalyst for the siloxanes, and thereafter curing the composition.

This invention also relates to glass which has been coated with a silsesquioxane having the general formula $RSiO_{3/2}$ wherein R is selected from the group consisting of the methyl, ethyl, vinyl, phenyl and 3,3,3-trifluoropropyl radicals, said silsesquioxane having a particle size in the range of 10 to 1,000 A., and subsequently coated with a composition comprising (1) from 0.1 to 5% by weight of a methylhydrogensiloxane, and (2) from 95 to 99.9% by weight of an essentially polydimethylsiloxane which had a viscosity of at least 100 cps. at 25° C., said composition having been cured.

Silicones of various kinds have been used for treating glass for sometime to impart various properties thereto. For example, glass in the form of fibers, filaments or cloth have been treated with silicones to make them water repellent, to improve the strength (both flexural and compressive) of laminates made therefrom, to improve their abrasion resistance, to improve their printability and dyeability, and to improve their drape and hand. Glass articles and sheet glass have also been treated with silicones to make them water repellent and to impart scratch resistance which results in reduced breakage.

One of the drawbacks which makes prospective customers reluctant to use silicones for treating glass is their lack of durability to washing. That is to say, the silicone is removed from the glass when it is washed.

It has now been discovered that when glass is first treated with a silsesquioxane and subsequently treated with the appropriate silicone composition, in accordance with this invention as set forth above, that the resulting silicone treatment has greatly improved durability to washing.

The silsesquioxane employed in this invention has the general formula $RSiO_{3/2}$ wherein R is selected from the group consisting of the methyl, ethyl, vinyl, phenyl and 3,3,3-trifluoropropyl radicals, said silsesquioxane having a particle size in the range of 10 to 1,000 A.

The silsesquioxane can be prepared, for example, by adding a silane of the formula $RSi(OR'')_3$, wherein R is as defined above and R'' is a hydrolyzable group such as an alkoxy or acyloxy group containing 1 to 4 carbon atoms or a $—CH_2CH_2OCH_3$, $—CH_2CH_2OC_2H_5$ or $—CH_2CH_2OH$ group, to a water-surfactant mixture, with agitation, under acidic or basic conditions. The surfactant must be either anionic or cationic in nature. Generally speaking, the amount of silane used should be less than 10% by weight based on the combined weights of the silane, water and surfactant, although more can be used if the rate of addition is carefully controlled. The silsesquioxane as prepared by this process is in the form of a colloidal suspension, and this suspension can be used directly in the treatment of the glass, or if preferable for some reason, the suspension can be first neutralized and then used to treat the glass. A detailed description for the preparation of the silsesquioxanes is found in abandoned U.S. patent application Ser. No. 427,077, filed Jan. 21, 1965, by Joseph Cekada, Jr., and Donald R. Weyenberg, and entitled "Colloidal Silsesquioxanes and Methods For Making Same"; the disclosure of which is incorporated herein by reference.

The silicone composition applied to the glass subsequent to the treatment with the silsesquioxane comprises (1) from 0.1 to 5% by weight of a methylhydrogensiloxane, (2) from 95 to 99.9% by weight of an essentially polydimethylsiloxane having a viscosity of at least 100 cps. at 25° C., and (3) a curing catalyst for the siloxanes. This composition is known in the art and is described in detail in U.S. Patent 3,061,567, the disclosure of which is incorporated herein by reference.

The first step in the process of this invention involves the application of the silsesquioxane, as a colloidal suspension, to the glass. The silsesquioxane can be applied by spraying, brushing, dipping, padding, or any other of the methods well known in the art. The particular method chosen will depend on the nature of the glass surface being treated, available equipment and individual preferences. After the colloidal suspension of the silsesquioxane has been applied, the glass is dried by any suitable means such as by air drying or heating. The amount of silsesquioxane employed should be sufficient so that there is a silsesquioxane solids pickup by the glass in the range of 0.05 to 5% by weight based on the weight of the glass. Preferably the solids pickup should be in the range of 0.1 to 1% for best results. Generally speaking, a pickup of less than 0.05% does not give good results, and little or no additional benefits are gained by applying more than 5%, especially in comparison to the added cost.

After the silsesquioxane has been applied to the glass, the silicone composition is applied. It can be applied either in solvent solution or as an aqueous emulsion. The methods of application can be any of those conventionally used and illustrated above for the silsesquioxane. After the application of the silicone composition, the glass is again dried. The drying can be an air dry followed by a short period of heating, or the drying can be accomplished by simply heating the cloth. As indicated above, heating after the application of the silicone composition is necessary. Heating simply causes the silicone composition to cure and thus the temperature is not critical so long as it does not exceed the decomposition temperature of the glass and the materials applied thereto. The amount of silicone composition used should be such that at least 0.1% by weight, based on the weight of the glass, is deposited on the glass. Less than 0.1% usually does not give satisfactory results. More than 10% of the silicone composition is seldom used because of economic factors and because few, if any, additional benefits are obtained.

In order that those skilled in the art may better understand how the present invention can be practiced, the following examples are given by way of illustration and not by way of limitation. All percents referred to herein are by weight and all viscosities measured at 25° C. unless otherwise specified.

In the examples below the glass cloth prepared in accordance with this invention was tested for creased tensile strength to determine the quality and durability of the silicone finish to washing. The creased tensile strength was measured initially and after five or ten washings with a commercial detergent at 120° F. in a Hot Point Washer.

The apparatus used for conducting the creased tensile tests was a Scott Tensile Tester of the pendulum type as described in ASTM-D-76-42. The speed of the pulling clamp was 12±0.5 inch per minute. The surface inclination was one inch height per 12 inches length per 5 inches width. A spring clamp was attached at the back of the unit to hold the sample. A solid four pound metal cylinder having a smooth surface was employed.

The creased tensile test consists of cutting three samples of the cloth 1½" x 8" in the warp and fill directions and raveling them by hand to 1" x 8" and then taping them. The sample is then folded from end to end, placed on the inclined surface, and clamped in place. The four pound cylinder is then placed on the sample in the vicinity of the clamp and allowed to roll (so that it exerts only its own weight) over the sample, away from the clamp, over the folded area, and off the sample so that a crease is formed. This procedure is repeated five times. The sample is kept clamped in position during the entire operation so that creasing occurs in exactly the same place and parallel to either warp or filling with each pass of the roller. After the five passes with the metal cylinder, the sample was carefully unfolded and tensile strength measured in accordance with ASTM-D-1682-59T. The average tensile strength in the tests run on the three samples is reported as the creased breaking strength of the cloth in pounds per inch.

EXAMPLE 1

Beta fiber glass was padded at 40 p.s.i. with an aqueous colloidal suspension containing about 0.263% $CH_3SiO_{3/2}$ solids having a particle size in the range of 10 to 1,000 A., a wet pickup of 38% being achieved.

Casement fiber glass was padded at 40 p.s.i. with an aqueous colloidal suspension containing about 0.294% $CH_3SiO_{3/2}$ solids having a particle size in the range of 10 to 1,000 A., a wet pickup of 34% being achieved.

After padding, all samples were dried for three minutes at 300° F. About 0.1% silsesquioxane solids was deposed on the glass cloths.

One-half of each of the above silsesquioxane treated samples was padded with a 3% solvent solution of a silicone composition comprising (1) 3% of a methylhydrogensiloxane, (2) 97% of a polydimethylsiloxane gum, and (3) a curing catalyst for the siloxanes to achieve a 17% wet pickup. After padding, the cloths were air dried and then the silicone composition cured one minute at 400° F.

For purposes of comparison, samples of the glass cloths which had not been treated with the silsesquioxane were treated with the silicone composition as above.

All samples of the glass cloth were then tested for creased tensile strength by the procedure described above. Results of the tests are set forth in the table below.

| Treatment | Beta Fiberglass | | | | Casement Fiberglass | | | |
| | Warp | | Fill | | Warp | | Fill | |
| | Initial | 5 washes | Initial | 5 washes | Initial | 5 washes | Initial | 5 washes |
|---|---|---|---|---|---|---|---|---|
| None* | 68 | 55.5 | 77 | 65.3 | 50.3 | 20 | 44.7 | 28 |
| Silsesquioxane only* | 106.3 | 64.7 | 105.7 | 61 | 47 | 20.5 | 20 | 23.2 |
| Silicone compositions only* | 101.3 | 83 | 96.2 | 90.7 | 57 | 47 | 73.4 | 28.7 |
| Silsesquioxane and silicone composition | 107.8 | 86.5 | 104.8 | 98 | 56 | 62.7 | 54.3 | 65 |

*Included for purposes of comparison.

EXAMPLE 2

The procedure of Example 1 was repeated using three aqueous colloidal suspensions containing 0.335%

$$CH_3SiO_{3/2}$$

solids differing only in particle size, wet pickups of 30% being achieved. A 7% solvent solution of the silicone composition was employed. Creased tensile strength tests were run on the above prepared samples (warp only) and the results are set forth in the table below. The approximate particle size of the silsesquioxanes is also set forth in the table.

| Treatment | Beta Fiberglass | | Casement Fiberglass | |
| | Initial | 5 washes | Initial | 5 washes |
|---|---|---|---|---|
| None* | 101 | 82 | 57 | 3 |
| Silsesquioxane (75 A.)* | 135 | 94 | 65 | 27 |
| Silsesquioxane (75 A.) and silicone composition | 141 | 124 | 82 | 65 |
| Silsesquioxane (110 A.)* | 104 | 90 | 60 | 23 |
| Silsesquioxane (110 A.) and silicone composition | 148 | 129 | 77 | 47 |
| Silsesquioxane (225 A.)* | 97 | 86 | 52 | 24 |
| Silsesquioxane (225 A.) and silicone composition | 124 | 124 | 70 | 65 |
| Silicone composition* | 121 | 126 | 56 | 53 |

*Included for purposes of comparison.

EXAMPLE 3

The procedure of Example 2 was repeated using the smallest and largest particle size silsesquioxanes as aqueous colloidal suspensions containing about 1.565 and 3.125% silsesquioxane solids and achieving wet pickups of 32%. About 0.5 and 1% solids, respectively, were deposited on the glass from these suspensions. Creased tensile strength tests were run on the above prepared samples (warp only) and the results are set forth in the table below.

| Treatment | Beta Fiberglass | | Casement Fiberglass | |
| | Initial | 5 washes | Initial | 5 washes |
|---|---|---|---|---|
| None* | 68 | 55.5 | 50.3 | 20 |
| Silicone Composition* | 121 | 123 | 55 | 53 |
| .5% silsesquioxane (75 A.) and silicone composition | 101.8 | 96.2 | 65.6 | 58.5 |
| 1% silsesquioxane (75 A.) and silicone composition | 123 | 118.4 | 79.2 | 53.8 |
| .5% silsesquioxane (225 A.) and silicone composition | 115.6 | 130.6 | 51 | 71.3 |
| 1% silsesquioxane (225 A.) and silicone composition | 112.8 | 129 | 55 | 62.2 |

*Included for purposes of comparison.

EXAMPLE 4

The procedure of Example 3 was repeated using the 1.565% aqueous colloidal suspension of the largest particle size silsesquioxane, depositing about 0.5% solids on the glass. The silicone composition employed was a 6% solvent solution instead of the 3% solution used previously. Creased tensile strength tests were run on the above prepared samples (warp only) and the results are set forth in the table below.

| Treatment | Beta Fiberglass | | Casement Fiberglass | |
|---|---|---|---|---|
| | Initial | 10 washes | Initial | 10 washes |
| None* | 101 | 86.7 | 53.7 | 3 |
| Silsesquioxane (225 A.) and silicone composition | 146.3 | 141.7 | 73 | 49.3 |

*Included for purposes of comparison.

EXAMPLE 5

The procedure of Example 4 was repeated except that an aqueous colloidal suspension of a phenyl silsesquioxane having a particle size in the range of 10 to 1,000 A. was employed. After the silicone composition was applied the samples were dried 3 minutes at 200° F. and then the composition cured one minute at 400° F. The beta fiberglass had a creased tensile strength of 146.3 initially and 141.7 after 10 washes, whereas the casement fiberglass had a creased tensile strength of 73 initially and 49.3 after 10 washes.

EXAMPLE 6

When the silsesquioxanes listed below are substituted for those of the previous examples and 0.05%, 0.3%, 0.7%, 1%, 3% or 5% solids thereof applied to the glass, essentially equivalent results are obtained.

(A) $C_2H_5SiO_{3/2}$
(B) $CH_2=CHSiO_{3/2}$
(C) $CF_3CH_2CH_2SiO_{3/2}$
(D) A mixture of $CH_3SiO_{3/2}$ and $C_2H_5SiO_{3/2}$
(E) A mixture of $CH_3SiO_{3/2}$ and $C_6H_5SiO_{3/2}$
(F) A copolymer of $CH_3SiO_{3/2}$ and $CF_3CH_2CH_2SiO_{3/2}$.

EXAMPLE 7

When the silicone compositions specified below are substituted for the composition used in the previous examples in concentrations of from 0.1 to 10%, essentially equivalent results are obtained.

(A)

(1) 1% trimethylsiloxy-endblocked methylhydrogenpolysiloxane fluid,
(2) 99% 3,000 cps. hydroxylated dimethylpolysiloxane fluid, and
(3) zinc octoate and dibutyltindiacetate to give 2% zinc and 0.34% tin based on the weight of the silicones, (B)

(1) 5% methylhydrogensiloxane,
(2) 95% 5,000 cps. linear dimethylpolysiloxane and
(3) dibutyltindilaurate.

EXAMPLE 8

When glass fibers, glass filaments, glass containers (for example bottles), sheets of glass or glass windshields are first treated with the silsesquioxanes and then the silicone compositions of the previous examples, improved durability of the silicone composition to washing is obtained.

That which is claimed is:

1. A process for treating glass which comprises first applying thereto a composition consisting essentially of an aqueous colloidal suspension of a silsesquioxane having the general formula $RSiO_{3/2}$ wherein R is selected from the group consisting of the methyl, ethyl, vinyl, phenyl and 3,3,3-trifluoropropyl radicals, said silsesquioxane having a particle size in the range of 10 to 1,000 A., drying the treated glass, and subsequently applying thereto a composition comprising:

(1) from 0.1 to 5% by weight of a methylhydrogensiloxane,
(2) from 95 to 99.9% by weight of an essentially polydimethylsiloxane having a viscosity of at least 100 cps. at 25° C., and
(3) a curing catalyst for the siloxanes, and thereafter curing the composition.

2. The process of claim 1 wherein the glass is in the form of cloth and the silsesquioxane is $CH_3SiO_{3/2}$.

3. The process of claim 2 wherein the glass is beta fiberglass.

4. The process of claim 2 wherein the glass is casement fiberglass.

5. The process of claim 1 wherein the glass is a windshield and the silsesquioxane is $CH_3SiO_{3/2}$.

6. Glass coated with a first layer of silsesquioxane having the general formula $RSiO_{3/2}$ wherein R is selected from the group consisting of the methyl, ethyl, vinyl, phenyl and 3,3,3-trifluoropropyl radicals, said silsesquioxane having a particle size in the range of 10 to 1,000 A., and coated with a second layer of a cured composition comprising:

(1) from 0.1 to 5% by weight of a methylhydrogensiloxane, and
(2) from 95 to 99.9% by weight of an essentially polydimethylsiloxane which had a viscosity of at least 100 cps. at 25° C.

7. The glass of claim 6 which is in the form of cloth and the silsesquioxane is $CH_3SiO_{3/2}$.

8. The glass of claim 7 which is beta fiberglass.

9. The glass of claim 7 which is casement fiberglass.

10. The glass of claim 6 which is a windshield and the silsesquioxane is $CH_3SiO_{3/2}$.

References Cited

UNITED STATES PATENTS

| | | |
|---|---|---|
| 2,836,611 | 5/1958 | Exner et al. |
| 2,891,920 | 6/1959 | Hyde et al. |
| 2,923,633 | 2/1960 | Stedman. |
| 3,061,567 | 10/1962 | Keil. |
| 3,162,614 | 12/1964 | Katchman. |
| 3,234,179 | 2/1966 | Katchman, et al. |
| 3,294,725 | 12/1966 | Findlay et al. |
| 3,377,309 | 4/1968 | Harper _____ 117—72 X |

WILLIAM D. MARTIN, *Primary Examiner.*

R. HUSACK, *Assistant Examiner.*

U.S. Cl. X.R.

117—76, 124, 126, 161